United States Patent
Dally (10) Patent No.: US 8,233,567 B2
(45) Date of Patent: Jul. 31, 2012

(54) METHOD AND APPARATUS FOR DATA RECOVERY

(75) Inventor: William J Dally, Palo Alto, CA (US)

(73) Assignee: Rambus Inc., Sunnyvale, CA (US)

( * ) Notice: Subject to any disclaimer, the term of this patent is extended or adjusted under 35 U.S.C. 154(b) by 793 days.

(21) Appl. No.: 12/348,719

(22) Filed: Jan. 5, 2009

(65) Prior Publication Data

US 2009/0110115 A1    Apr. 30, 2009

Related U.S. Application Data

(63) Continuation of application No. 10/944,616, filed on Sep. 17, 2004, now Pat. No. 7,489,739.

(51) Int. Cl.
*H03K 9/00* (2006.01)
*H04L 7/00* (2006.01)

(52) U.S. Cl. .................................... 375/316; 375/355

(58) Field of Classification Search .......... 375/354–376, 375/316, 322, 324, 327, 326, 229, 340; 327/141, 327/144; 713/375, 400, 500–503, 600, 601; 714/699, 798; 360/51, 39; 365/230.01, 230.03, 365/230.06, 230.08, 231, 233.1, 233.17
See application file for complete search history.

(56) References Cited

U.S. PATENT DOCUMENTS

| | | |
|---|---|---|
| 3,155,102 A | 11/1964 | Niederer, Jr. et al. |
| 3,638,121 A | 1/1972 | Spilker, Jr. |
| 3,922,491 A | 11/1975 | Bjork et al. |
| 4,384,354 A | 5/1983 | Crawford et al. |
| 4,648,133 A | 3/1987 | Vilnrotter |
| 5,111,208 A | 5/1992 | Lopez |
| 5,122,978 A | 6/1992 | Merrill |
| 5,243,626 A | 9/1993 | Devon et al. |
| 5,436,908 A | 7/1995 | Fluker et al. |
| 5,485,490 A | 1/1996 | Leung et al. |

(Continued)

FOREIGN PATENT DOCUMENTS

JP    02000035831    8/1990

OTHER PUBLICATIONS

RaSer™ X Product Brief, "Highly Flexible 10 Gbps Backplane Serial Link Interface," Copyright 2003 Rambus, Inc., all rights reserved, 2 pages.

(Continued)

*Primary Examiner* — David C. Payne
*Assistant Examiner* — Vineeta Panwalkar
(74) *Attorney, Agent, or Firm* — Haynes Beffel & Wolfeld LLP (57) ABSTRACT

A method for recovering data includes oversampling an input data signal to provide sample sets, and storing a plurality of sample sets in addressable memory. The sample sets are processed, using sequential logic to make determinations of respective samples suitable for use in data recovery from corresponding sample sets. One function applied for the determination, includes taking a first mean transition position in a first group of sample sets, taking a second mean transition position in a second group of sample sets, computing a slope value for change in transition position, and making the determination based on the order of the plurality of samples, the first and second means, and the slope. The determined samples are obtained and data recovery is achieved. Sample sets can be modified according to equalization functions. Other modifications include encoding the sample sets for data compression.

23 Claims, 5 Drawing Sheets

U.S. PATENT DOCUMENTS

| | | | |
|---|---|---|---|
| 5,511,091 | A | 4/1996 | Saito |
| 5,523,760 | A | 6/1996 | McEwan |
| 5,548,146 | A | 8/1996 | Kuroda et al. |
| 5,554,945 | A | 9/1996 | Lee et al. |
| 5,621,913 | A | 4/1997 | Tuttle et al. |
| 5,742,798 | A | 4/1998 | Goldrian |
| 5,805,619 | A * | 9/1998 | Gardner et al. ............... 714/814 |
| 5,848,099 | A | 12/1998 | Benner |
| 5,859,881 | A | 1/1999 | Ferraiolo et al. |
| 6,047,346 | A | 4/2000 | Lau et al. |
| 6,157,740 | A | 12/2000 | Buerkle et al. |
| 6,163,570 | A | 12/2000 | Olafsson |
| 6,173,345 | B1 | 1/2001 | Stevens |
| 6,219,384 | B1 | 4/2001 | Kliza et al. |
| 6,282,210 | B1 | 8/2001 | Rapport et al. |
| 6,321,282 | B1 | 11/2001 | Horowitz et al. |
| 6,359,931 | B1 | 3/2002 | Perino et al. |
| 6,369,652 | B1 | 4/2002 | Nguyen et al. |
| 6,377,640 | B2 | 4/2002 | Trans |
| 6,396,329 | B1 | 5/2002 | Zerbe |
| 6,421,389 | B1 | 7/2002 | Jett et al. |
| 6,434,081 | B1 | 8/2002 | Johnson et al. |
| 6,442,644 | B1 | 8/2002 | Gustavson et al. |
| 6,448,815 | B1 | 9/2002 | Talbot et al. |
| 6,456,221 | B2 | 9/2002 | Low et al. |
| 6,463,392 | B1 | 10/2002 | Nygaard et al. |
| 6,469,555 | B1 | 10/2002 | Lau et al. |
| 6,473,439 | B1 | 10/2002 | Zerbe et al. |
| 6,484,232 | B2 | 11/2002 | Olarig et al. |
| 6,510,503 | B2 | 1/2003 | Gillingham et al. |
| 6,539,072 | B1 | 3/2003 | Donnelly et al. |
| 6,556,934 | B2 | 4/2003 | Higashide |
| 6,560,716 | B1 | 5/2003 | Gasparik et al. |
| 6,606,350 | B2 | 8/2003 | Dress, Jr. et al. |
| 6,643,787 | B1 | 11/2003 | Zerbe et al. |
| 6,657,468 | B1 | 12/2003 | Best et al. |
| 6,662,305 | B1 | 12/2003 | Salmon et al. |
| 6,690,741 | B1 | 2/2004 | Larrick, Jr. et al. |
| 6,717,992 | B2 | 4/2004 | Cowie et al. |
| 6,806,910 | B2 | 10/2004 | Hebbalalu et al. |
| 6,810,087 | B2 | 10/2004 | Hoctor et al. |
| 6,889,357 | B1 | 5/2005 | Keeth et al. |
| 6,907,096 | B1 * | 6/2005 | Lueker et al. ................. 375/355 |
| 6,911,874 | B2 | 6/2005 | Dvorak |
| 7,009,533 | B1 * | 3/2006 | Wegener ........................ 341/76 |
| 7,050,522 | B2 | 5/2006 | Schmatz et al. |
| 7,110,396 | B2 | 9/2006 | Saha et al. |
| 7,142,621 | B2 | 11/2006 | Vallet et al. |
| 7,349,498 | B2 | 3/2008 | Cranford, Jr. et al. |
| 2001/0056332 | A1 | 12/2001 | Abrosimov et al. |
| 2002/0072870 | A1 | 6/2002 | Adam et al. |
| 2002/0138224 | A1 | 9/2002 | Sessions |
| 2002/0149824 | A1 | 10/2002 | Beaulieu et al. |
| 2003/0026399 | A1 | 2/2003 | Carlson |
| 2003/0041292 | A1 * | 2/2003 | Lee et al. ...................... 714/700 |
| 2003/0063597 | A1 | 4/2003 | Suzuki |
| 2003/0149991 | A1 | 8/2003 | Reidhead et al. |
| 2003/0198212 | A1 | 10/2003 | Hoctor et al. |
| 2003/0198308 | A1 | 10/2003 | Hoctor et al. |
| 2004/0032354 | A1 | 2/2004 | Knobel et al. |
| 2004/0057500 | A1 | 3/2004 | Balachandran et al. |
| 2004/0217881 | A1 | 11/2004 | Pedyash et al. |
| 2005/0010958 | A1 * | 1/2005 | Rakib et al. .................... 725/111 |
| 2005/0163202 | A1 | 7/2005 | Hampel et al. |

OTHER PUBLICATIONS

Yellowstone Technology Brief, "High Performance Memory Interface Technology," Copyright 2003 Rambus, Inc., all rights reserved, 2 pages.

Redwood Technology Brief, "High Performance Parallel Bus Interface Technology," Copyright 2003 Rambus, Inc., all rights reserved, 2 pages.

RDRAM® Overview, "High Performance Memory Interface Solution," Copyright 2003 Rambus, Inc., all rights reserved, 4 pages.

Lewis, Dave, "Easy-to-Use LVDS Serdes for the Serdes Neophyte," National Semiconductor, National Edge (Sep. 2001) 5 pages, http://www.national.com/nationaledge/sep01/864.html.

Paris, Lluis et al., "WP 24.3: An 800MB/s 72 Mb SLDRAM with Digitally-Calibrated DLL," ISSCC Slide Supplement IEEE 1999, 352-353.

U.S. Appl. No. 10/278,478, filed Oct. 22, 2002, entitled "Timing Calibration Apparatus and Method for a Memory Device Signaling System."

Zerbe, Jared et al., U.S. Appl. No. 09/776,550, filed Feb. 2, 2001, entitled "Method and Apparatus for Evaluating and Calibrating a Signaling System."

Zerbe, Jared et al, U.S. Appl. No. 09/976,170, filed Oct. 21, 2001, entitled "Method and Apparatus for Evaluating and Optimizing a Signaling System."

U.S. Appl. No. 10/278,708, filed Oct. 22, 2002, entitled "Phase Adjustment Apparatus and Method for a Memory Device Signaling System."

U.S. Appl. No. 09/941,079, filed Aug. 28, 2001 entitled "Clock Data Recovery with Selectable Phase Control Input."

Nakase, Yasunobu et al, "Source-Synchronization and Timing Vernier Techniques for 1.2-GB/s SLDRAM Interface," IEEE Journal of Solid-State Circuits, vol. 34, No. 4 (Apr. 1999), 494-501.

Gillingham, Peter, "SLDRAM Architectural and Functional Overview," SLDRAM Consortium (Aug. 29, 1997), 1-14.

"Draft Standard for a High-Speed Memory Interface (SyncLink)", Draft 0.99 IEEE P1596.7-199X (1996), 56 pages.

Gillingham, Peter, "SLDRAM: High-Performance, Open-Standard Memory," IEEE (1997), 29-39.

SLDRAM Inc., "400 Mb/s/pin SLDRAM," Draft Advance (Jul. 9, 1998), 1-69.

Rambus "Direct Rambus Short Channel Layout Guide, Version 0.95" (Aug. 2001) , 40 pages.

Rambus "Direct Rambus Long Channel Design Guide" (2000), 45 pages.

Intel "How to Measure RDRAM* System Clock Jitter" Application Note AP-667 (Jun. 1999), pp. 1-15.

Chang, Kun Yung "Design of a CMOS Asymmetric Serial Link" A Dissertation Submitted to the Department of Electrical Engineering and the Committee on Graduate Studies of Stanford University Aug. 1999, 119 pages.

Rambus, Inc. "RDRAM Direct Rambus Clock Generator" (Apr. 2002), 22 pages.

Yang, Chih-Kong Ken "Design of High-Speed Serial Links in CMOS" Technical Report No. CSL-TR-98-775, Sponsored by Center for Integrated Systems, Sun Microsystems and LSI Logic Inc. Dec. 1998, pp. 1-182.

Widmer, A.X., et al., "A DC-Balanced, Partitioned-Block, 8B/10B Transmission Code," IBM J. Res. Develop., vol. 27, No. 5, Sep. 1983, 440-451.

Banu, Mihai, et al., "TA 6.4: A 660Mv/s CMOS Clock Recovery Circuit with Instantaneous Locking for NRZ Data and Burst-Mode Transmission," IEEE International Solid State Circuits Conference, 1993, 102-103, 270.

Eldering, Charles A., et al., "Digital Burst Mode Clock Recovery Technique for Fiber-Optic Systems," Journal of Lightwave Technology, vol. 12, No. 2, Feb. 1994, 271-279.

Chang, Ken K. Y., et al., "A 2 Gb/s Asymmetric Serial Link for High-Bandwidth Packet Switches," Hot Interconnects V, Stanford University, Aug. 1997, 1-9.

Hu, Timothy H., et al., "A Monolithic 480 Mb/s Parallel AGC/Decision/Clock-Recovery Circuit in 1.2-• CMOS," IEEE Journal of Solid-State Circuits, vol. 28, No. 12, Dec. 1993, 1314-1320.

Kim, Sungjoon, et al, "An 800Mbps Multi-Channel CMOS Serial Link with 3x Oversampling," IEEE 1995 Custom Integrated Circuits Conference, 22.7.1-22.7.4.

Nakamura, Kazuyuki, et al., "A 6 Gbps CMOS Phase Detecting DEMUX Module Using Half-Frequency Clock," 1998 Symposium on VLSI Circuits Digest of Technical Papers, 196-197.

Poulton, John, et al., A Tracking Clock Recovery Receiver for 4Gb/s Signaling, Hot Interconnects '97, Aug. 21-23, 1997, Palo Alto, CA, 1-13.

Dally, W, et al., "Digital Systems Engineering," Cambridge University Press, 1998, pp. 447-449.

Cerisola, M., et al., "CORD—a WDM Optical Network: Control Mechanism Using Subcarrier Multiplexing and Novel Synchronization Solutions," Communications, 1995. ICC 95 Seattle, Gateway to Globalization, 1995 IEEE International Conference on , vol. 1 , Jun. 18-22, 1995, pp. 261-265 vol. 1.

EIA/JEDEC Standard No. 8-B (JESD8-B) "Interface Standard for Nominal 3 V/3.3 V Supply Digital Integrated Circuits," (Sep. 1999) 12 pages.

EIA/JEDEC Standard No. 8-6 (EIA/JESD8-6) "High Speed Transceiver Logic (HSTL) A 1.5 V Output Buffer Supply Voltage Based Interface Standard for Digital Integrated Circuits," (Aug. 1995) 16 pages.

JEDEC Standard—JESD8-16 "Bus Interconnect Logic (BIC) for 1.2 Volts," (Apr. 2004) 16 pages.

Daniele, N. et al., "Principle and Motivations of UWB Technology for High Data Rate WPAN Applications," SOC 2003, 4 pages.

Daniele, Norbert, "Ultra Wide Band Principles and Applications for Wireless Communications," CEA-LETI Annual Review, Jun. 25-26, 2002, 24 pages.

Lee, Ming-Ju Edward, et al., "A 90mW 4Gb/s Equalized I/O Circuit with Input Offset Cancellation," 2000 IEEE International Solid State Circuits Conference, 3 pages.

Win, Moe Z., et al., "Impulse Radio: How it Works," IEEE Communications Letters 2(2), Feb. 1998, 36-38.

Daniele, Norbert, "Ultra Wide Band Principles and Applications for Wireless Communications," CEA-LETI Annual Review, Jun. 25-26, 2002, 23 pages.

* cited by examiner

METHOD AND APPARATUS FOR DATA RECOVERY

RELATED APPLICATIONS

This application is a continuation of U.S. patent application Ser. No. 10/944,616, filed on 17 Sep. 2004, which application is incorporated by reference as if fully set forth herein.

BACKGROUND OF THE INVENTION

1. Field of the Invention

The present invention relates to clock and data recovery for data communications.

2. Description of Related Art

Systems often include a number of devices operating at nominally the same clock rate, but that in fact have slightly different clock rates due to manufacturing limitations and other factors. Such systems are referred to as plesiochronous, that is having nearly the same clock rate, and as generating plesiochronous data signals. Such systems typically communicate using protocols that require the receiving device to detect the clock rate of the incoming signal, and synchronize the receiver with the recovered clock. Thus, many so-called clock and data recovery (CDR) technologies have been developed for plesiochronous systems.

Many applications are being developed which require serial receivers that quickly lock on to an incoming plesiochronous data signal to recover the bit stream carried by the signal. Circuits downstream from Fiber Channel switches that switch without re-clocking, for example, have this requirement, as do circuits downstream from all-optical switches.

The conventional method of dealing with this problem is to add a preamble before an actual data cell or packet, and use a conventional CDR circuit to lock to this preamble before the data starts. The preamble comprises overhead associated with clock recovery, consuming communications bandwidth. One can reduce this overhead by using a CDR circuit with a short time constant. However this sacrifices timing stability for speed of lock.

Another method described in the prior art is based on oversampling, and a "tally" or "phase picking" circuit, which accumulates a relatively small set of samples for recovery of a number of bits, such as 12 or 24 samples for recovery of 4 or 8 bits of data, and applies combinational logic on the sample to recover the data bits by picking sample positions within the small set of samples. See, Yang, DESIGN OF HIGH-SPEED SERIAL LINKS IN CMOS, Technical Report No. CSL-TR-98-775, Stanford University, December 1998, pages 115-129; and Dally and Poulton, DIGITAL SYSTEMS ENGINEERING, Cambridge University Press, 1998, pages 447-449.

It is desirable to provide technology for receiving plesiochronous streams of data with reduced overhead in the transmission channel, suitable for high speed operation.

DETAILED DESCRIPTION

Technology is disclosed which can achieve a reduction in overhead associated with clock and data recovery, and which is applicable for use in systems using plesiochronous data signals, as well as in systems using mesochronous or asynchronous data signals. An aspect of the technology relates to a method for recovering data from a data signal which includes oversampling the data signal with reference to a sample parameter, such as phase of a receiver clock, to provide sample sets including samples of respective data symbols, and storing a plurality of sample sets in addressable memory. The sample sets are processed and clock and/or data information for a particular data stream is recovered by making determinations of respective samples, or subsets of samples, including at least one member, for particular sample sets in the plurality of sample sets. The determined samples or subsets of samples are suitable for use in clock and/or data recovery. The determination is a function of the samples in more than one sample set, and in some embodiments a function based on sequential logic, of samples taken during more than one cycle of a sequential logic clock. One function which may be applied for the determination, includes taking a first mean transition position in a first group of the plurality of sample sets, taking a second mean transition position in a second group of the plurality of sample sets, computing a slope value for change in transition position over the plurality of samples, and making the determinations based on the order of the plurality of samples, the first and second mean transition positions, and the slope. The determined samples or subsets of samples used for data recovery for the plurality of sample sets are obtained from the memory based on the determinations, and recovered data is provided. In some alternative implementations, the sample sets are modified by logic in the receiver. Modifications include equalization procedures, before or after processing for making the determinations, which improve reception quality. Other modifications include compression procedures, or other encoding processes, for the sample sets before storing them in the memory. Yet other modifications include adjustments of the transition positions within a sample set to improve data recovery.

Other aspects of the disclosed technology include an integrated circuit, including resources implementing embodiments of the method described above, and a data file in a machine readable medium, which characterizes integrated circuit modules for implementation of embodiments of the method described above. Another aspect of the disclosed technology includes a switch, which switches a plurality of data streams without re-clocking and a receiver that adjusts to recover data after switching, without loss of data and without requiring clock recovery preamble on the switched data streams.

Even though some latency is introduced in the procedure from the time of transmission of a data symbol or a packet of data symbols until the time that the data is recovered, the data recovery can be characterized as instantaneous, or "instant data recovery," because no clock recovery preamble is required. Furthermore, some or all of the latency introduced by the procedure is offset by reduction in latency due to elimination of the clock recovery preamble.

Figure 1:
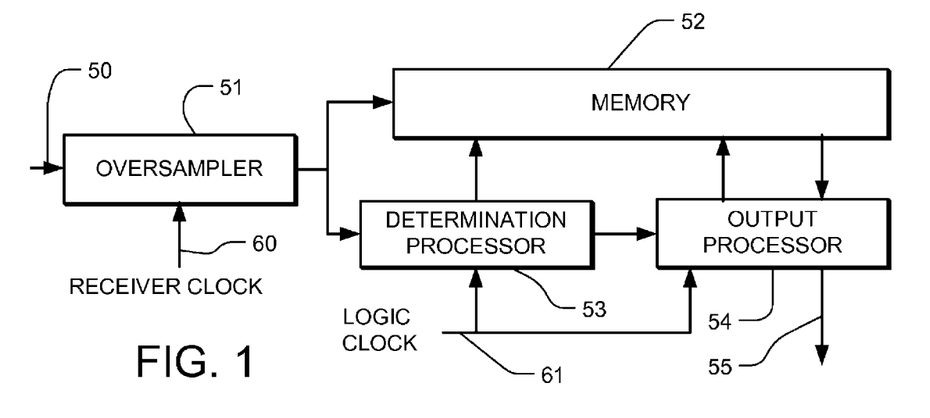
FIG. 1 is a simplified block diagram of a data recovery receiver.

Representative implementations of systems implementing the "instant data recovery" method described above are shown by the block diagrams in FIGS. 1-3. FIG. 1 illustrates a receiver for an incoming data stream on line 50, which is mesochronous, plesiochronous or asynchronous relative to a receiver clock. An oversampler 51 provides sample sets which include samples from corresponding data symbols in the incoming data stream. For example, the oversampler 51 provides sample sets which comprise samples taken on respective phase shifted edges of a receiver clock from line 60, where transitions from logic 1 to logic 0 or vice versa in the sample sets indicate edges of data symbols in the data stream. The sample sets are applied to a memory 52 and to a determination processor 53, in parallel, which operate in response to a logic clock on line 61 in response to which sequential processing is executed. In one embodiment, the logic clock on line 61 and the receiver clock on line 60 are produced from a single clock source. The memory 52 is implemented for example using high-speed static random access memory organized as a circular buffer in one embodiment, organized as a register file in another embodiment, or organized in a ping-pong architecture in yet another embodiment. The memory 52 is addressable for reading and writing selected samples, and/or selected sample sets. The size of the memory 52 is large enough to hold a plurality of sample sets sufficient to buffer the data stream, in one example system, during the interval in which the determination processor 53 makes the determinations of selected samples or sample subsets within the sample sets suitable for data recovery. In one embodiment, the memory holds over 100 samples, which for 6× oversampling comprises samples for recovery of about 16 bits from an incoming data stream or in other embodiments the memory holds thousands of samples.

The determination processor 53 processes groups of sample sets to make determinations of respective subsets for particular sample sets in the plurality of sample sets in the memory. The determined subsets include one or more samples that are suitable for use in data recovery. In a typical embodiment, the determined subset is the sample computed to be most likely at the middle of a data symbol in the particular sample set. The determination in embodiments of the invention is a function of the samples in more than one sample set. In some embodiments a relatively large number of sample sets, such as more than 128 sample sets, as used by sequential logic that generates results based on sample sets taken in more than one clock cycle of the sequential logic clock from line 61. The determination is based on computing a pattern of change in response to the sample sets and in response to the order in which the sample sets are received, and applying the pattern to make a determination. In one example, where the sample sets include a number of logic 1's and logic 0's, and in which a logic 1 adjacent to logic 0 (01 or 10) is a transition in the sample set, the pattern of change can be based on variations in positions within the sample sets of the transitions. For example, a pattern of change includes a first mean transition position in a first group of sample sets in the plurality of sample sets, a second mean transition position in a second group of samples in the plurality of sample sets, and a derivative or slope across the plurality of sample sets based on the first and second means. Depending on the character of the data symbols and the data stream being processed, statistics other than the mean can be applied, including the median, mode, or other statistical values. The group of sample sets used for computation of the mean (or other statistical value) includes first and second halves of the plurality of sample sets to which the pattern of change is applied, in one embodiment. In other embodiments, less than half is used for the determination of the statistical values. Also, more than two groups can be analyzed, for use in determining the pattern of change, allowing fitting functions in addition to linear slope. Also, characteristics of the sample sets other than transition positions can be used to determine a pattern of change, including for example run lengths of constant logic values.

The determination processor 53 provides an indicator to the output processor 54. The indicator identifies the determined subset of samples for particular sample sets, where the determined subset is used for data recovery in representative embodiments. For example, the indicator includes, or is used to determine, the address in the memory 52 of the sample or samples that were likely sampled close to the centerpoint of the corresponding data symbol. The output processor 54 reads by addressing the memory 52, the particular sample or samples for particular sample sets from the memory 52, and supplies recovered data-out on line 55.

Thus, according to embodiments of the described technology, using an oversampled receiver can eliminate the need for a clock recovery preamble by sampling all of the bits of a packet (or of a segment for a packet) at several phases of a receiver clock to provide sample sets, and then a posteriori determining a sampling phase for each sample set, and then applying the determined sampling phase to the oversampled data to recover the data from the packet. Of course the described technology works as well in the presence of clock recovery preambles.

For example, although the method can be used with other sampling rates, a receiver that takes six samples per nominal bit time can be applied for the purpose of explanation. Over a packet of 128 Bytes (1K bits), the six times oversampling receiver produces 6K samples, comprising 1K sample sets of six samples each. All 6K samples, or encodings of the 6K samples, are stored and processed to recover a sample phase for each sample set in this example. Once the sample phase is determined, the data bits of the packet are recovered by addressing the memory at the proper sampling phase for each sample set, and reading or interpreting as necessary, the result.

A process to recover the sampling phase from the plurality of samples, can be understood in a mesochronous case, where the frequency of the data clock in the incoming data stream is the same as the frequency of the receiver clock. In this case, the sampling phase of the receiver clock is nominally constant across all bits. However, jitter due to timing jitter and intersymbol interference ISI may cause individual edges to be displaced from the nominally constant position.

In one approach to determining a sampling phase in this mesochronous case, the plurality of sample sets is processed by counting how many transitions occur in each of the six possible phases across the plurality of samples, to produce a result that comprises an array of sum $C_i$, where i is an index (1 to 6 in a six sample set) on sample position within the respective sample sets, and $C_i$ is the total number of transitions in the sample position i. For example, suppose our counts are $C_1=0$ (sample position 1: 0 transitions), $C_2=0$ (sample position 2: 0 transitions), $C_3=113$ (sample position 3: 113 transitions), $C_4=377$ (sample position 4: 377 transitions), $C_5=22$ (sample position 5: 22 transitions), $C_6=0$ (sample position 6: 0 transitions), or in simpler form (0 0 113 377 22 0). These counts arise from an edge distribution centered at position i=2.8 ($8/10$ of the way from sampler 2 to sampler 3) with a standard deviation of 0.5 sample (1/12 bit time). The actual position of the mean can be estimated by computing sum($iC_i$)/sum($C_i$). Here the computation returns 2.82. With the transition at position x=2.82, if the data stream is arranged for sampling data at the center of the eye, then the sampling position for the sample sets in a mesochronous system with 6 samples per bit period is computed by adding 3 to the transition position x, modulo 6. In this example, the sample position is that sample closest to x+3 (mod 6)=5.82. If we must pick a bit from just one sampler, we will choose sampler 0 since it is the closest to 5.82 (mod 6). Information from multiple sampler positions can be combined in other embodiments for recovery of data.

In a plesiochronous case, the receiver clock (sample clock) and transmitter clock (data clock) nominally have the same frequency, but differ in frequency by small amounts because for example of the use of different clock sources that are not precisely matched. If the receiver clock and the transmitter clock differ by 100 ppm (parts per million), or $10^{-4}$, then the transition position in a sample set will shift by about 0.1 bit position (0.6 samples) across 1024 bits. The frequency difference can be estimated by computing separate counts for the two groups of sample sets in a plurality of sample sets, such as in the plurality of sample sets for the 1024 bits. In one example, the two groups consist of respective halves of the 1024 sample sets. For example, in a case where the transition drifts from position 1.6 (on the first bit) to position 2.2 (on the last bit), counts are collected (0 66 180 17 0 0) for the first half and (0 22 203 33 0 0) for the second half estimating transition positions of $x_1$=1.81 and $x_2$=2.04, respectively. (The actual positions are 1.75 and 2.05). From the estimates, the total drift is estimated to be, $\Delta x = 2(x_2-x_1)=0.46$, and the phase of the first sample set $x_S=x_1-\Delta x/4=1.70$. (The actual values are 0.6 and 1.6). From these, the edge position for bit position j, where j goes from 1 to 1K for a 1K bit packet, in the incoming data stream is estimated as $x_j=x_j+j\Delta x/N$, where N is the total number of sample sets, 1K or 1024 in this case.

While the counts are accumulated by processing circuits, the sampled data is stored in memory. In one embodiment, the data from the samplers is stored into a 6K-bit RAM (e.g, a 64×96 bit array).

Figure 2:
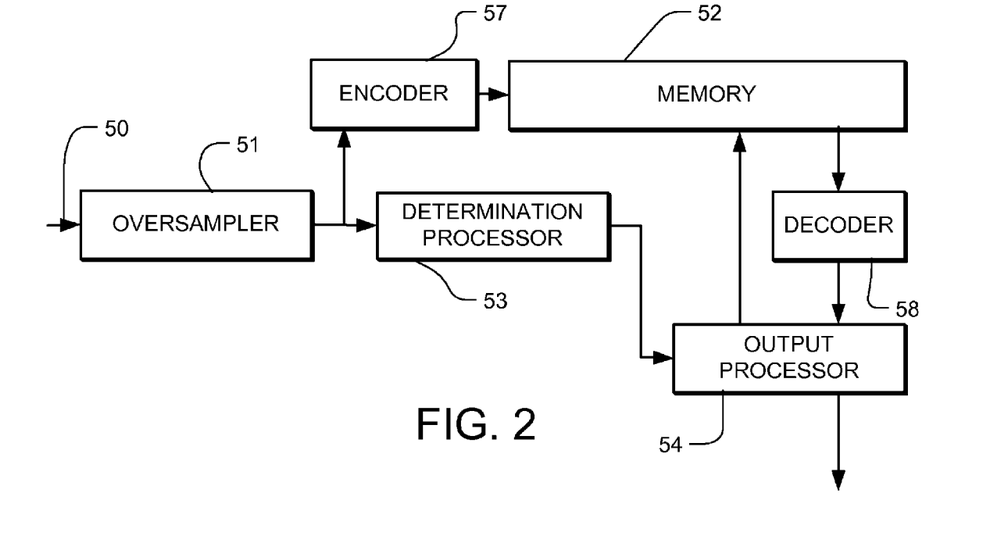
FIG. 2 is a simplified block diagram of an alternative embodiment of a data recovery receiver, with encoding and decoding of sample sets.

FIG. 2 illustrates another embodiment, in which the sampled data is encoded for compression, or otherwise, before storing in the memory. Encoding for compression enables use of smaller memory, taking advantage of regularity in the oversampled data. Components in FIG. 2 that are like those of FIG. 1 have the same reference numerals. As can be seen, an encoder 57 is placed in the data path between the oversampler 51 in the memory 52. A decoder 58 is placed in the data path between the memory 52 in the output processor 54 to decompress the stored sample sets.

One method of encoding the data for compression is based on the observation that the most likely sequences to occur during a sample set (6 samples) are (1—no transitions, 2—a transition in the sample with the highest count within the plurality of sample sets, 3—a sample one position off from that position). Thus, after a short initialization sequence, the six sample bits can be encoded as:

0—no transition
 10—transition in position of highest count
 110—transition in position of highest count+1,
 111—transition in position of highest count−1

Transitions during the other three bit positions are less likely for reasonable values of jitter and can be rounded into codes 110 or 111. For average bit sequences, this encoding requires less than two bits per bit period. However, the memory must be sized for a worst-case sequence, and the worst-case sequence requires over two bits per bit period.

Many other encodings are possible. For example, a straightforward encoding scheme may be used to encode the current transition position as a three-bit code:

000—no transition
 001—transition in position 0
 010—position 1
 011—position 2
 100—position 3
 101—position 4
 110—position 5
 111—escape When encoding transitions in this manner, it is desirable to "center" the samples so that most transitions take place between samplers 2 and 3. This makes the probability of two transitions during one bit period very small. This is accomplished by observing the first few transitions and then rotating the samples among the sample sets, or in other words shifting the sample set boundaries, appropriately. The samples for the first few bits (for example 2 bytes) during which these transitions occur are directly recorded in the memory, and can be referred to as an initialization sequence. This adjustment in the boundaries of the sample set can be performed in the encoder 57, or elsewhere in the data flow.

In a system that performs clock and/or data recovery in this manner, a major parameter is the size of the window in the data stream. The size of the window in the data stream is the number of sample sets in the plurality of sample sets over which transition counts are accumulated. Choosing a larger window gives more accurate estimates of transition positions. However a larger window requires a larger memory to store the samples, or encoded versions of the samples, and delays the data significantly. In one approach, a size of the window to be used can be determined based on the total root mean square RMS jitter of the system, j. After one sample, an estimate with standard deviation s equal to j is available for processing. After accumulating N samples, the estimate has a standard deviation of s=j/sqrt(N). To have a bit error rate BER of less than $10^{-15}$ for example, the standard deviation s should be low enough that 8s<k, where k is a nominal estimation error for the system.

For example, suppose total jitter j is 0.1 UI RMS (0.6 sample periods) and the nominal estimation error is 0.25 sample periods. To maintain a BER of $10^{-15}$, the window will need to be large enough to store enough sample sets (or encoded sample sets) to encompass 370 transitions for eight times our standard deviation s to be within budget, 8s<0.1/sqrt(370). Typically a number of sample sets is determined by the number of transitions and the worst case transition density.

With less input jitter and a larger budget, smaller windows can be used. For example an input jitter of 0.05 UI RMS (which extends to +/−0.4UI at 8 sigma) and a nominal estimation error of 0.5 sample periods, a window of 24 transitions can be used. If a minimum transition density in the data stream is 0.25 transitions per bit, a window of just 100 bits or about 12 bytes could be used.

This estimate is a bit rough as it does not include the effect of quantization jitter, which can be significant in such a system. The quantization jitter is typically considered to be uniformly distributed, from −0.5 to +0.5 sample periods.

The accuracy of estimates of transition positions (zero crossings) is improved in some embodiments by multi-level sampling. For example, suppose we generate two bits per sample (quaternary samples) and that the zero crossing occurs between 01 and 10. A transition from 01 to 10 or 00 to 11 would imply a transition half way between the two sample positions, while a transition from 00 to 10 would imply a transition ¾ of the way between the sample positions. Similarly a 01 to 11 transition implies the zero crossing is ¼ of the way between the sample positions.

In one processing approach, all of the transition positions are counted (for both halves of the window) and all of the sample sets in the window are compressed and stored in the memory. Then, the stored and compressed samples are processed to generate the recovered data. The data is recovered by first decompressing the stored values, to generate six samples per bit period, and then selecting the sample closest to the estimated eye center for each bit. In alternative systems without compression, the selected sample is directly addressed in the addressable memory, and used for data recovery.

When an incoming data segment is longer, without interruption, than the plurality of sample sets over which determination is made, new bits are processed as data is recovered from earlier bits by reading the determined samples out of the memory. In one embodiment, the system includes three sets of counters, and supporting processing logic. The first and second sets of counters are used for a first window, the second and third set of counters are used for a second window, and the third and first sets of counters are used for a third window, and so on.

Figure 3:
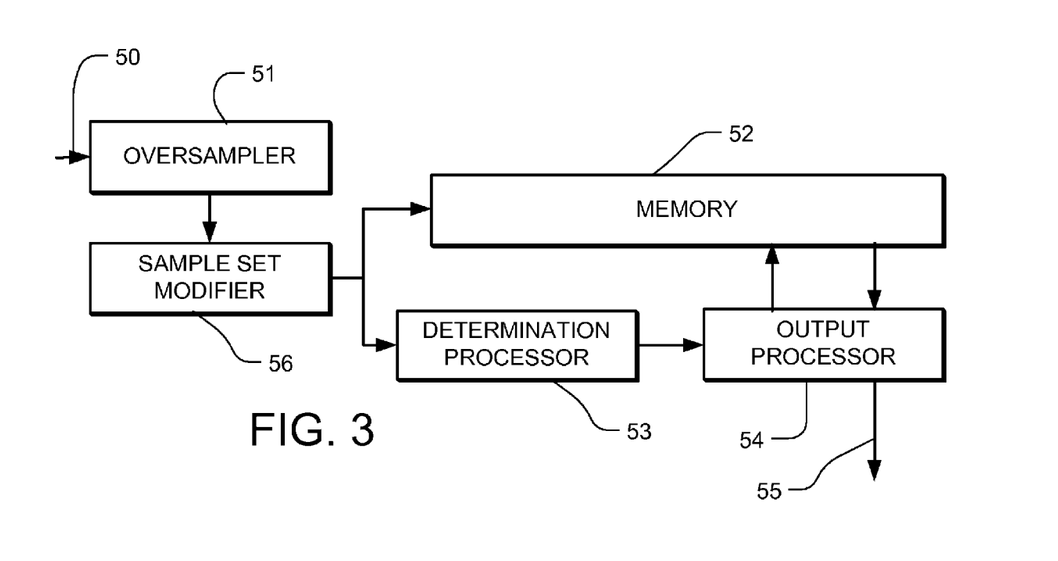
FIG. 3 is a simplified block diagram of an alternative embodiment of a data recovery receiver, with modification of sample sets.

FIG. 3 illustrates yet another embodiment of the described technology, in which the incoming sample sets are modified for the purposes of equalization or other enhancement of the data stream to improve data recovery. Components in FIG. 3 that are like those of FIG. 1 have the same reference numerals. In the embodiment of FIG. 3, a sample set modifier 56 is inserted in the data path after the oversampler 51 and before the memory 52 and the determination processor 53. The modifier 56 can modify the incoming sample sets according to an equalization function, or the like, to improve data recovery. In other embodiments, the modifier can be placed in the data path between the memory 52 and the output processor 54, where the modifications do not affect operation of the determination processor 53.

Thus, in addition to enabling locking to a plesiochronous bit stream with no preamble, storing and postprocessing the oversampled data with sequential logic, also enables receive equalization. For example, if the input line is zero for several bit times and then transitions to 1, the transition is likely to be delayed because of baseline shift. The modifier 56 can compensate for this by rewriting the sequence:

L L 000011 to L L 00011 where L is shorthand for 000000. Similarly a foreshortened pulse can be widened by a rewrite rule in the modifier 56.

Similar rewrite rules can be applied to handle high-to-low transitions, and foreshortened low-going pulses as well as transitions and pulses of different widths occurring in different sample positions. Rules can also be applied to encode transitions and foreshortened pulses after low or high periods of different lengths.

One embodiment performs equalization by rewriting the samples according to a set of rules using a TCAM (ternary content addressable memory) in modifier 56. After the oversampler 51 provides the sample sets, or alternatively after the output processor 54 recovers the original sample sets from the data stored in memory 52, a running history (including for example the last 36 samples—6 sample sets of 6 samples each) of these recovered samples are input to the CAM. If the CAM matches a rule, the most recent six samples are replaced with a modified set of samples, otherwise the six bits are passed unchanged. In an alternative, the modification is performed after reading out the determined samples from the memory for recovery of a data bit, based on information about adjacent sample sets, or based on adjacent bits in the streams of recovered data.

Figure 4:
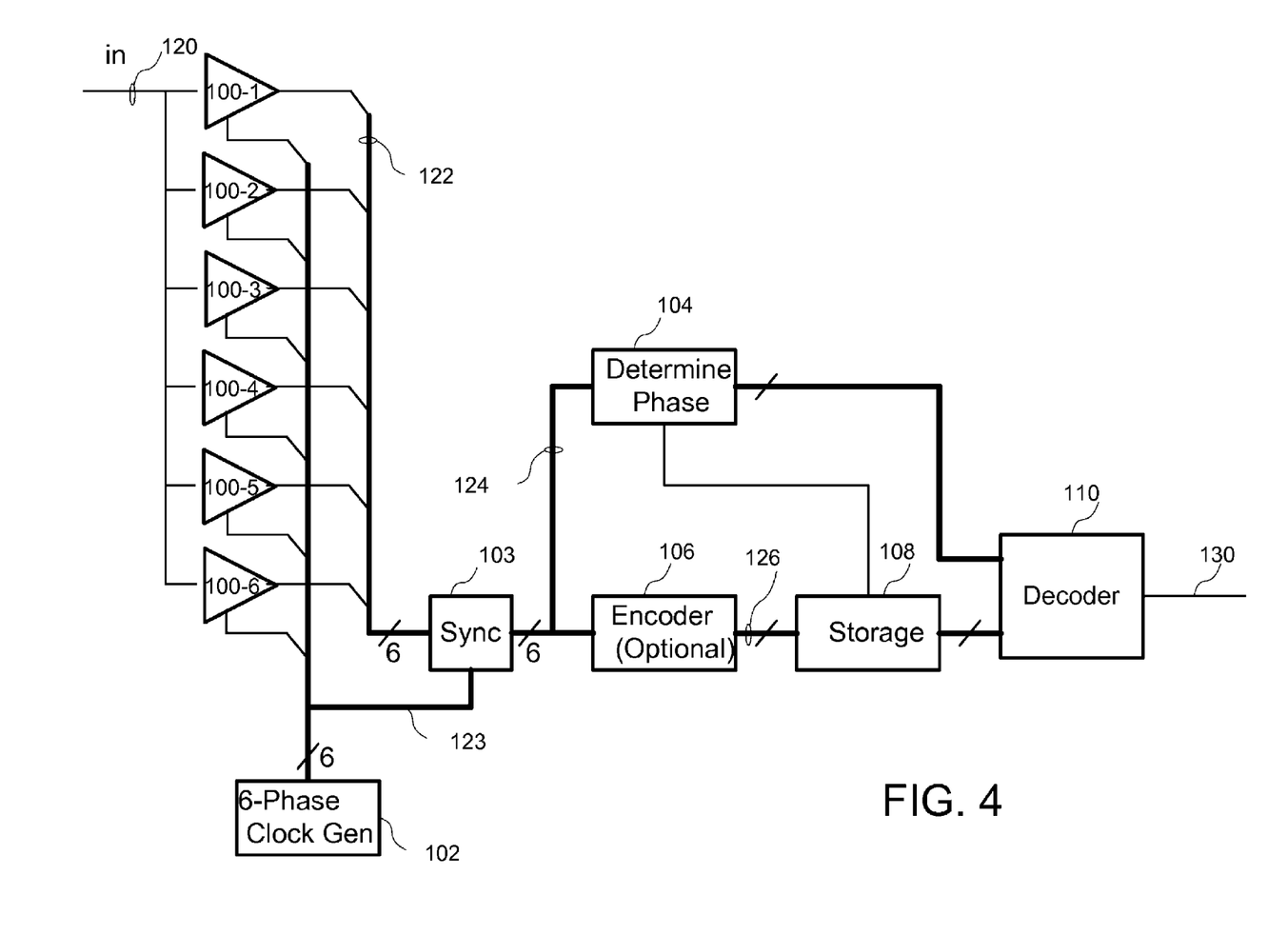
FIG. 4 is a more detailed logical block diagram of a data recovery receiver.

A more detailed block diagram of one receiver implementation with instant clock and/or data recovery is shown in FIG. 4. A bank of six samplers 100-$i$, where i goes from 1 to 6, are clocked by six phase shifted versions of the receiver clock on line 123, produced for example using a six-phase clock generator 102, to oversample the input waveform, which carries a data stream comprising a sequence of data symbols, on input line 120. The input line in this example is a 100-ohm differential pair. Other transmission media can be connected as the input line, as well. Sample sets consisting of six samples are acquired during each cycle of the receiver clock, where the sample sets include samples of respective data symbols in the data stream. The six samples (line 122) for each period of the receiver clock, which comprise a sampling cycle, are input to a synchronizer 103 to synchronize them all to a clock phase of the receiver clock used by sequential processing circuits in the receiver. The synchronized samples (line 124) are input both to storage block 108, via line 126 from an optional encoder 106, and to a processor block 104 that determines the phase of the received signal. The encoded, oversampled data is stored in the storage block 108 for access after determination of sample phases for the corresponding sample sets. Once a window of data has been received, the processor block 104 determines the sampling phases for the plurality of sample sets in the received data and instructs decoder 110 to begin reading the appropriate samples out of storage block 108, and generating an output stream 130 at the data rate.

Alternative implementations include systems that use any number of samplers. In addition, sample sets are arranged so that they span an interval that is close to the length of the data symbols in the data stream. In this manner, each sample set normally includes at least one sample corresponding with one data symbol. In alternatives, the sample sets can be arranged so that they span an interval that is a multiple of the length of the data symbols in the data stream, collecting samples from several data symbols in parallel, with appropriate adjustments in the width of the buses in the logic circuitry. For example with 6× oversampling for an interval that is close to the length of a data symbol in the data stream, with two data symbols acquired per period of the receiver clock, 12 samplers would be used and all internal buses would be 12 samples wide, for sequential processing of 12 samples at a time. Also, alternative systems use clock sources for the sample clocks on line 123 which are implemented using circuits other than phase shifting circuits, such as higher frequency clocks that are synchronized with the receiver clock, and produce sample pulses at sample times within the sample cycles. In one embodiment, the sample times are essentially equally spaced within the receiver clock period. In other examples the sample times are unequally spaced.

Figure 5:
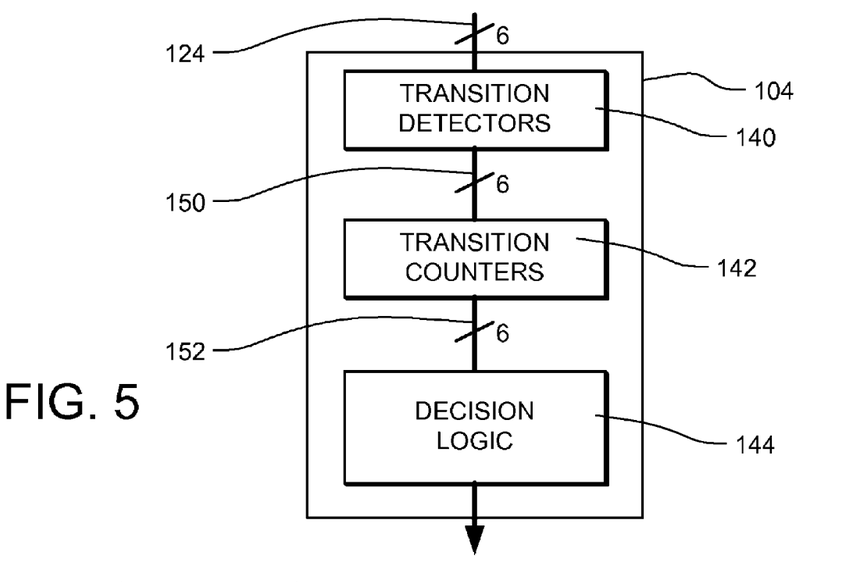
FIG. 5 illustrates logical components of an example of the processor block 104 in the diagram of FIG. 4.

With reference to FIG. 5, one embodiment of processor block 104 comprises sequential logic including transition detectors 140 followed by a set of transition counters 142 followed in turn on line 152 by decision logic 144. The synchronized output of the samplers on line 124 is input to the transition detectors 140, which can be implemented using a bank of 6 XOR gates. Each transition detector in the set of transition detectors 140 outputs a logical "1" if its sample differs from the previous sample, otherwise it outputs a logical "0". A flip-flop (not shown) is used in one embodiment to hold the last sample of each group of six to detect transitions between groups of samples. For example, if the input to the transition detector is 000111, the output is 000100 indicating that a transition occurred on the fourth sample.

The transition counters 142 are reset to zero at the beginning of each window of data, where the window is one of the two or more groups of sample sets within a plurality of sample sets used for making determinations of phase. The window over which a computation is made includes a group of half of the plurality of samples in one embodiment. In other embodiments, the group includes less than half the plurality of samples, such as one quarter of the sample sets in the plurality of sample sets. The number of transitions in each bit position is accumulated during the window. In one embodiment, the transition counters 142 include six 10-bit synchronous binary counters, one for each of the six bit positions in the sample sets.

In operation, for example, if the six counts are 0, 0, 3, 12, 4, 0 and 000100 is received from the transition detectors, the new counts will be 0, 0, 3, 13, 4, 0—the count of transitions in the fourth bit position is incremented. In embodiments in which only a single transition occurs during each bit period (i.e., transition line 150 will almost always be "one-hot"), a single incrementer can be shared across the six counters.

This saves logic but allows only a single counter to be incremented each bit period. Note that if multiple bit periods are sampled in parallel, the transition detectors may detect multiple transitions in a single sample period, or transitions during different sample periods. For example, for multiple transitions in a single sample period, with 6× oversampling and two data symbols per period of the receiver clock, a 12 sample input sample set of 000111111000 would give output from the transition detectors of 000100000100 on line 150, and increment the fourth transition counter by two.

For example, for transitions in a different sample periods, an input sample set of 000111110000 would give output from the transition detectors of 000100001000 on line 150, and increment both the third and fourth transition counters by one.

The decision logic 144 keeps track of the windows, controls the transition counters, and controls the output decoder. An implementation of the decision logic 144 is shown in more detail in FIG. 6.

Figure 6:
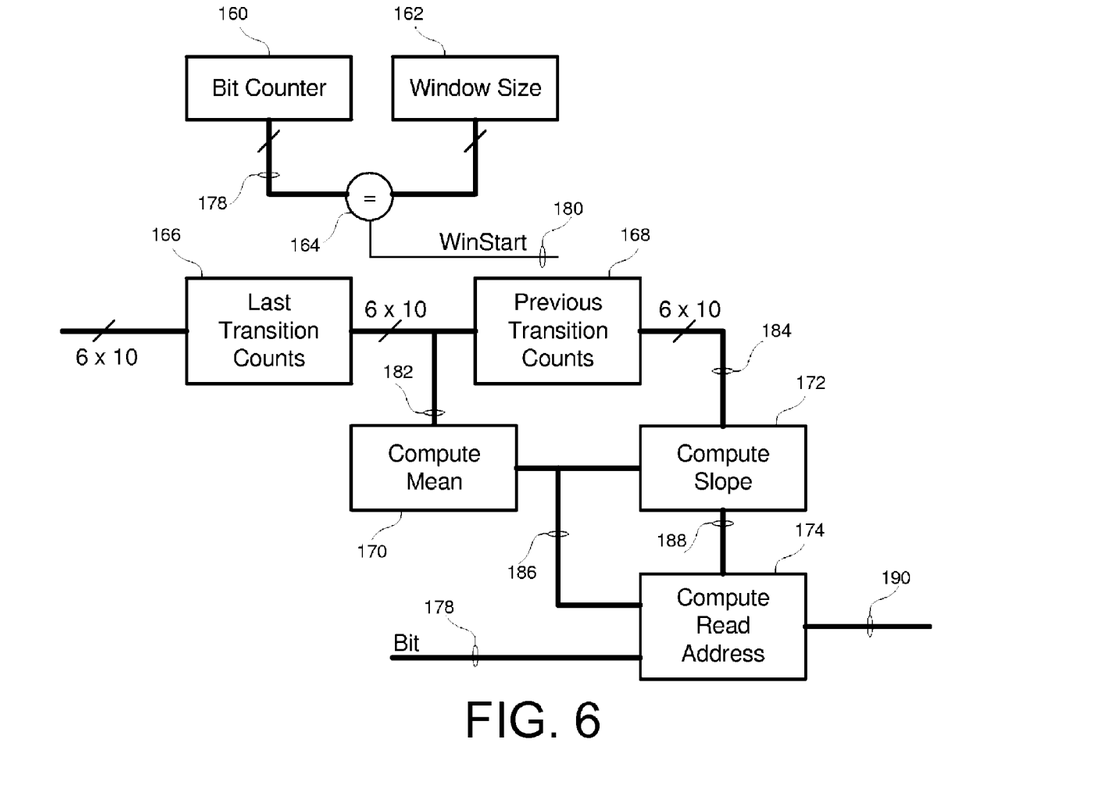
FIG. 6 illustrates logical components of an example of the decision logic 144 in the diagram of FIG. 5.

The decision logic in FIG. 6 includes a bit counter 160 supplying a bit count on line 178 which determines the current position in the window. The state of this counter 160 is compared by equality comparator 164 to a value in a window size register 162, indicating a size of, for example, half the size of the plurality of samples over which the determination of sampling phase is applied. When the bit counter 160 equals the window size, the window is complete and signal WinStart (180) is asserted. At this point the bit counter 160 is reset, the transition counters 142 values are sampled into "last transition count" registers 166, while the values in the "last transition count" registers 166 are moved to "previous transition count" registers 168, and the transition counters 142 are reset. In register transfer notation, when WinStart is asserted:
  bitCount=0
  lastTransCount[i]=transCount[i]; (i=0, . . . , 5)
  prevTransCount[i]=lastTransCount[i]; (i=0, . . . , 5)
  transCount[i]=0; (i=0, . . . , 5)

These register transfers are made logically at the same time in this embodiment, so that on the next clock cycle the transition counters are zero, the last transition count registers hold the transition counts from the last window (window j), and the previous transition count registers hold the transition counts from the previous window (window j−1).

Once the transition counts for two windows are available in registers 166 and 168, blocks 170 and 172 use these values, via lines 182 and 184, respectively, to compute a pattern of change over the plurality of sample sets. In one embodiment, the mean positions of the transition positions, or of the center of the eye between transitions, is determined for each window, and the amount by which this position changes (e.g. a slope) across the two windows is computed. Both blocks 170 and 172 compute a mean of the transition distribution. They do this by computing:

$$\text{mean} = \frac{\sum_{i=0}^{5} i \times count_i}{size}$$

In one embodiment, the multiplications by 0, 1, 2, and 4 are performed with fixed shifts. Multiplying by 3 and 5, each require a fixed shift and an add. Finally the weighted counts for transitions 1 through 5 are summed by a tree of four adders—for a total of six adders. Window sizes are restricted to be a power of 2 allowing the final divide by size to be performed by a fixed shift. In one embodiment window sizes up to 1024 bit times are supported, requiring 10-bit counters, and a 13-bit output from the adder tree (5120 is the maximum output). The final division gives a 13-bit fixed point number with 3 bits to the left of the binary point and 10 bits to the right. In some implementations the 10-bit fractional portion may be rounded or truncated (say to 5 bits) to save downstream logic.

Once the mean transition position has been computed for both sets of counters, a slope is computed by subtracting the two means and dividing by the number of sample sets over which the slope is to be applied. The result indicates a change in mean transition position per sample set. In equation form the computation is:

slope=(mean$_j$−mean$_{j-1}$)/size

In one embodiment, this slope calculation is performed on 3.10 bit fixed-point numbers (3 bits to the left of the binary point, 10 bits to the right) resulting in a 4.10 bit signed difference and a 14-bit signed result with the most significant bit 6 bits to right of the binary point. As with the mean calculation, some implementations may truncate this result (say to 6 bits) with the MSB weighted by $2^{-6}$.

An alternate embodiment can be realized by eliminating previous transition count registers 168 and instead using a register that retains only the previous mean to be used in the slope computation.

Once the mean transition position and the slope have been calculated, the information is transmitted via lines 186 and 188, respectively, to block 174 which uses these numbers to compute a read address into storage block 108 for each sample set. Logically this block computes the phase to be read for sample set k as:

phase(k)=mean+slope×(k−size/2)

This computation is easily performed in an incremental manner where the phase of the first bit position is given by phase(0)=mean−slope×size/2 where the multiply by size/2 (a power of 2) requires only a left shift. Subsequent phases are computed from the immediate previous phase as phase(k)=phase(k−1)+slope For full precision phase is represented in 23-bit, 3.20, form with the 3.20 number being added to the 14-bit slope on each step. However, the computation can be truncated (say to a 3.12 number being added to a 6-bit slope) in some implementations.

The accumulation of phase is performed modulo 6, for an embodiment with 6× oversampling. If the phase wraps from 5 to 0, the symbol address is incremented—skipping over a sample set in storage block 108. Similarly if the phase wraps from 0 to 5 (slope can be negative) the symbol address is decremented—reading two bits from the same sample set in storage block 108.

Once the decision logic 144 has computed the read address 190 (bit position and phase) to be read from storage block 108, decoder 110 (FIG. 4) recovers the current bit from the stored corresponding sample set. If the data is not encoded (encoder 106 is omitted) this simply involves selecting the specified bit with a multiplexer. If the data is encoded as described above, the data is first decoded into 6-bit data and then the specified bit is extracted.

Implementations of the sequential logic acting as the processor block 104, encoder 106 and decoder 110, include dedicated logic circuits such as arithmetic logic units, adders, registers, CAM circuits, and shifters, programmable logic devices such as programmable gate arrays, processors responsive to software such as microcomputer core logic, and combinations of two or more of these.

Exemplary embodiments have been described with reference to mesochronous and plesiochronous systems. In other embodiments, the received data stream is asynchronous within some bound of the receiver technology. For example, the data rate of in input data stream can be modulated by spread spectrum techniques, or can be substantially different than the receiver clock frequency. For such asynchronous data streams, larger sample sets, larger storage blocks 108 and more complex processing may be utilized to recover the data.

Figure 7:
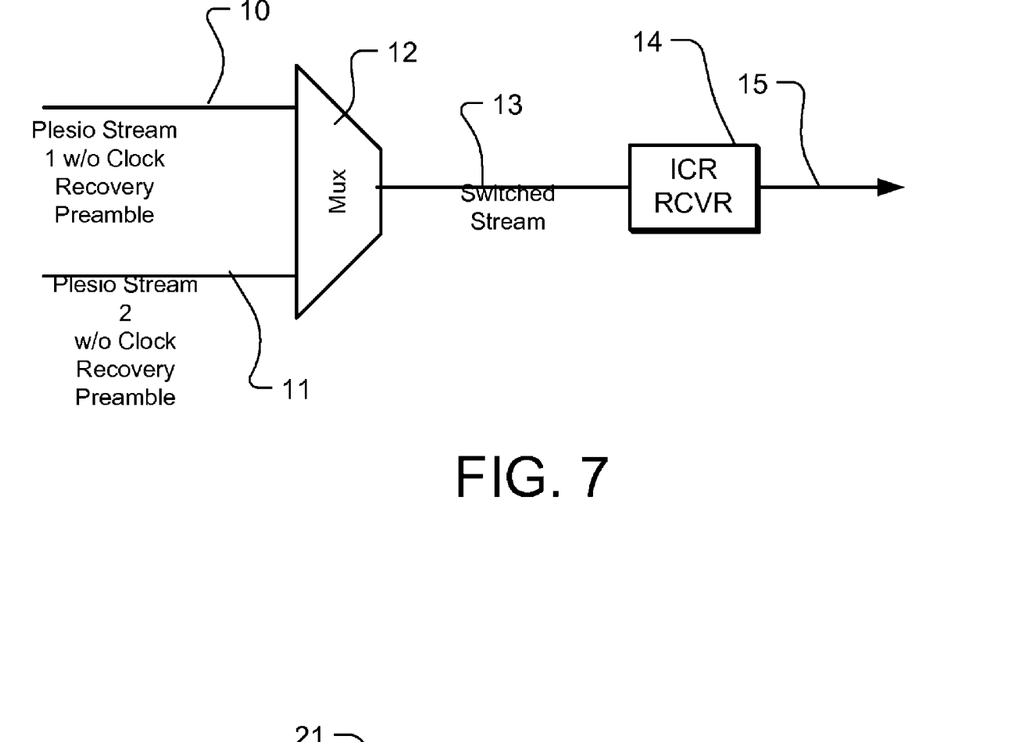
FIG. 7. shows an apparatus including a data recovery receiver and a multiplexer switching plesiochronous data streams without re-clocking.

FIG. 7 illustrates one application of a receiver component as described above. In this application, an apparatus comprises a multiplexer 12 or other switch, coupled to a first data stream on line 10 and a second data stream on line 11. The output of the multiplexer 12 is applied as a switched stream on line 13 to an "instant clock recovery" ICR receiver 14, as described above. Recovered data is applied on line 15. The first and second of data streams are plesiochronous, or asynchronous, relative to a receiver clock in the receiver 14. The multiplexer 12 does not reclock the data streams after switching. Thus, the switched stream on line 13 on the input of the ICR receiver 14 includes a discontinuity in the data clock rates on each switching event. The ICR receiver 14 recovers the data without loss, and without requiring a clock recovery preamble to be inserted in the switched stream on line 13.

Figure 8:
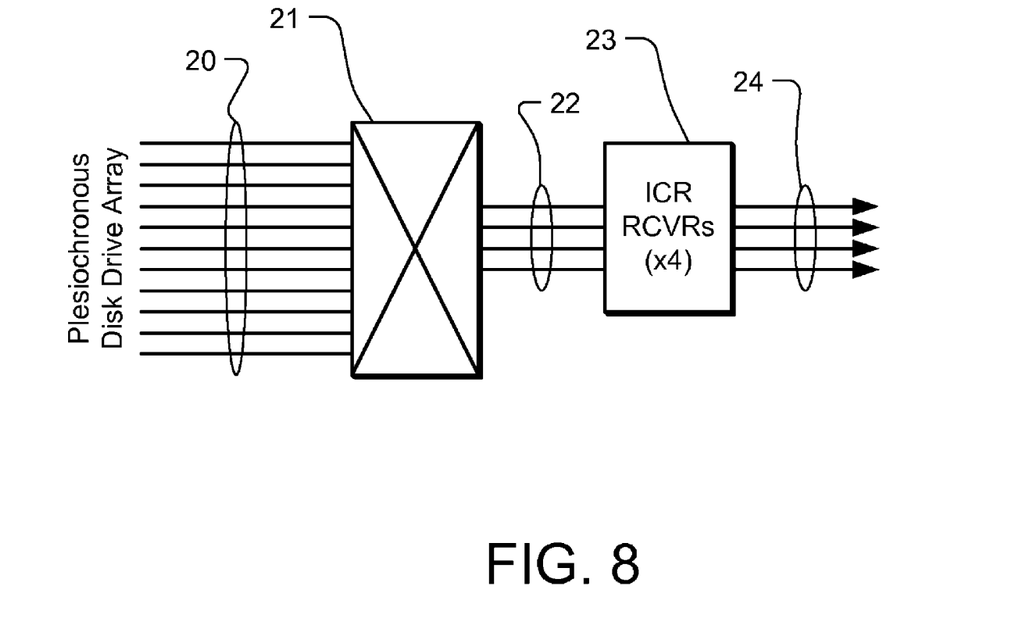
FIG. 8 shows an apparatus including a switch for a plesiochronous disk drive array, such as occurs in fiber channel networks, including data recovery receivers.

FIG. 8 illustrates an extension of the simplified switching apparatus of FIG. 7 to the environment such as a fiber channel network serving a disk drive array. The disk drive array supplies a large number of plesiochronous data streams 20 as input to a crossbar switch 21. A subset of the plesiochronous data streams 20 is provided at the output of switch 21 without reclocking, on a set of data lines 22. A corresponding set of ICR receivers 23 is coupled to the set of data lines 22, and provides recovered data on lines 24.

In alternatives, the incoming data stream is oversampled in response to a sample parameter other than receiver clock phase. For example, the incoming data stream can be oversampled in response to a receiver threshold using a set of receivers which compare the amplitude of the incoming signal with stepped threshold values, on a common phase of the receiver clock, producing a plurality of samples during a single clock phase indicating whether the amplitude of the data symbol has exceeded the corresponding plurality of stepped threshold values. The transition positions over the plurality of stepped threshold values can be computed applying logic similar to that described above. In yet other alternatives, more than one parameter of incoming data stream is oversampled in parallel, and sequentially processed for data recovery as described above.

Circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Such data formats in which such descriptions can be implemented include, but are not limited to, formats supporting behavioral languages like C, formats supporting register transfer level RTL languages like Verilog, and VHDL, and formats supporting geometry description languages like GDSII, GDSIII, GDSIV, CIF, MEBES and other suitable formats and languages. Data transfers of such files on machine readable media including carrier waves can be done electronically over the diverse media in the Internet or through email, for example. Physical files can be implemented on machine readable media such as 4 mm magnetic tape, 8 mm magnetic tape, 3½ inch floppy media, CDs, DVDs and so on.

One skilled in the art will understand that only a few possible embodiments of the disclosed technology are described, involving storing oversampled data until enough is accumulated to make a reliable determination of a sample point, and postprocessing to recover the data from the stored sample sets.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for recovering data from a data signal carrying data symbols, comprising:
   oversampling the data signal with a receiver to provide sample sets;
   storing a plurality of the sample sets in memory;
   determining data symbol transition times by sequentially processing the plurality of the sample sets, including computing a pattern of change in the plurality of sample sets, and applying the pattern to make said determination; and
   using the determined data symbol transition times and the sample sets in the memory to determine the data symbols from the stored data samples.

2. The method of claim 1, wherein the determined data symbol transition times identify respective subsets for particular sample sets in the plurality of sample sets, the respective subsets including one or more samples suitable for use in data recovery; and
   after storing the plurality of sample sets in the memory, reading out the respective subset for a particular sample set in the plurality of sample sets from the memory.

3. The method of claim 1, including oversampling the data signal with reference to phase of a receiver clock.

4. The method of claim 3, wherein the data signal is plesiochronous relative to the receiver clock.

5. The method of claim 1, wherein said determination is a function of the samples in more than two sample sets, and of an order of the sample sets.

6. The method of claim 1, including modifying at least one sample set in the plurality of sample sets based on an equalization function.

7. The method of claim 1, wherein the plurality of sample sets consists of 6 or more samples per data symbol.

8. The method of claim 1, wherein the plurality of sample sets consists of more than 100 samples.

9. An integrated circuit, comprising:
an input adapted for connection to a data signal carrying data symbols;
a memory;
oversampling circuitry coupled to the input and to the memory, which oversamples the data signal to provide a plurality of sample sets, and which stores the plurality of sample sets in the memory;
a sequential processor responsive to a sequential logic clock arranged to make determinations of data symbol transition times for more than two sample sets in the plurality of sample sets as a function of at least two of the sample sets in the plurality, including logic to compute a pattern of change in the plurality of sample sets, and to apply the pattern to make said determination; and
logic to use the determined data symbol transition times and the sample sets in the memory to determine data symbols from the stored data samples.

10. The integrated circuit of claim 9, wherein the determined data symbol transition times identify respective subsets for particular sample sets in the plurality of sample sets, the respective subsets including one or more samples suitable for use in data recovery; and
logic to read out the respective subset for a particular sample set in the plurality of sample sets from the memory after the plurality of sample sets is stored in the memory.

11. The integrated circuit of claim 9, wherein the oversampling circuitry oversamples the data signal with reference to phase of a receiver clock.

12. The integrated circuit of claim 10, wherein the data signal is plesiochronous relative to the receiver clock.

13. The integrated circuit of claim 9, wherein said determination is a function of the samples in more than two sample sets, and of an order of the sample sets.

14. The integrated circuit of claim 9, including a sample set modifier that modifies at least one sample set in the plurality of sample sets based on an equalization function.

15. The integrated circuit of claim 9, wherein the sample sets consist of 6 or more samples per data symbol.

16. The integrated circuit of claim 9, wherein the plurality of sample sets consist of more than 100 samples.

17. An apparatus including a receiver having an input for a data signal, the receiver comprising:
a memory;
oversampling circuitry coupled to the input and to the memory, which oversamples the data signal to provide a plurality of sample sets, the sample sets including samples of the respective data symbols, and which stores the plurality of sample sets in the memory;
a sequential processor responsive to a sequential logic clock arranged to make, determinations of data symbol transition times for more than two sample sets in the plurality of sample sets as a function of at least two of the sample sets in the plurality, including logic to compute a pattern of change in the plurality of sample sets, and to apply the pattern to make said determinations; and
logic to use the determined data symbol transition times and the sample sets in the memory to determine the respective data symbols from the stored data samples.

18. An apparatus, comprising:
a switch, having a plurality of inputs and at least one output, which switches without re-clocking to provide a data signal on the at least one output;
a receiver, coupled to the at least one output of the switch, the receiver including
a memory;
oversampling circuitry coupled to the input and to the memory, which oversamples the data signal to provide a plurality of sample sets, the sample sets including samples of the respective data symbols, and which stores the plurality of sample sets in the memory;
a sequential processor responsive to a sequential logic clock arranged to make, determinations of data symbol transition times for more than two sample sets in the plurality of sample sets as a function of at least two of the sample sets in the plurality, including logic to compute a pattern of change in the plurality of sample sets, and to apply the pattern to make said determinations; and
logic to use the determined data symbol transition times and the sample sets in the memory to determine the respective data symbols from the stored data samples.

19. An apparatus for recovering data from a data signal, comprising:
means for oversampling the data signal with a receiver to provide sample sets, the sample sets including samples of respective data symbols;
means for storing a plurality of the sample sets in memory;
means for determining data symbol transition times by sequentially processing the plurality of the sample sets; and
means for using the determined data symbol transition times and the sample sets in the memory to determine the respective data symbols from the stored data samples.

20. A method for recovering data from a data signal, comprising:
oversampling the data signal with reference to a sample parameter to provide sample sets, the sample sets including samples of the respective data symbols;
modifying at least one sample set;
storing a plurality of sample sets in memory, including the at least one modified sample set;
processing more than one sample set in the plurality of sample sets to make determinations of respective subsets for particular sample sets in the plurality of sample sets, the respective subsets including one or more samples suitable for use in data recovery, including computing a pattern of change in the plurality of sample sets, and applying the pattern to make said determinations; and
after storing the plurality of sample sets in the memory, reading out the respective subset for the at least one modified sample set in the plurality of sample sets from the memory.

21. A method for recovering data from a data signal, comprising:
oversampling the data signal with reference to a sample parameter to provide sample sets, the sample sets including samples of the respective data symbols;
modifying at least one sample set according to an equalization function;
storing a plurality of sample sets in memory, including the at least one modified sample set;
processing more than one sample set in the plurality of sample sets to make the determinations of respective subsets for particular sample sets in the plurality of sample sets, the respective subsets including one or more samples suitable for use in data recovery, including computing a pattern of change in the plurality of sample sets, and applying the pattern to make said determinations; and after storing the plurality of sample sets in the memory, reading out the respective subset for the at least one modified sample set in the plurality of sample sets from the memory.

22. A method for recovering data from a data signal, comprising:

oversampling the data signal with reference to a sample parameter to provide sample sets, the sample sets including samples of the respective data symbols;

modifying at least one sample set for data compression;

storing a plurality of sample sets in memory, including the at least one modified sample set;

processing more than one sample set in the plurality of sample sets to make determinations of respective subsets for particular sample sets in the plurality of sample sets, the respective subsets including one or more samples suitable for use in data recovery, including computing a pattern of change in the plurality of sample sets, and applying the pattern to make said determinations; and after storing the plurality of sample sets in the memory, reading out the respective subset for the at least one modified sample set in the plurality of sample sets from the memory.

23. An apparatus comprising:

a transmitter to transmit a data signal carrying data symbols;

a receiver to receive the data signal including a memory and oversampling circuitry coupled to the input and to the memory, which oversamples the data signal to provide a plurality of sample sets, and which stores the plurality of sample sets in the memory;

a sequential processor responsive to a sequential logic clock arranged to make, determinations of data symbol transition times for more than two sample sets in the plurality of sample sets as a function of at least two of the sample sets in the plurality, including logic to compute a pattern of change in the plurality of sample sets, and to apply the pattern to make said determinations; and logic to use the determined data symbol transition times and the sample sets in the memory to determine the data symbols from the stored data samples.

* * * * *